United States Patent
Artzi et al.

(10) Patent No.: US 10,778,508 B2
(45) Date of Patent: Sep. 15, 2020

(54) BYPASS SWITCH WITH EVALUATION MODE FOR IN-LINE MONITORING OF NETWORK TRAFFIC

(71) Applicant: Keysight Technologies, Inc., Minneapolis, MN (US)

(72) Inventors: Ophir S. Artzi, Austin, TX (US); Kevin Formby, Austin, TX (US)

(73) Assignee: Keysight Technologies, Inc., Santa Rosa, CA (US)

( * ) Notice: Subject to any disclaimer, the term of this patent is extended or adjusted under 35 U.S.C. 154(b) by 92 days.

(21) Appl. No.: 15/807,882

(22) Filed: Nov. 9, 2017

(65) Prior Publication Data

US 2019/0140893 A1    May 9, 2019

(51) Int. Cl.
| | | |
|---|---|---|
| *H04L 12/24* | (2006.01) | |
| *H04L 12/26* | (2006.01) | |
| *H04L 12/707* | (2013.01) | |
| *H04L 12/721* | (2013.01) | |

(52) U.S. Cl.
CPC ...... *H04L 41/0695* (2013.01); *H04L 41/0659* (2013.01); *H04L 41/22* (2013.01); *H04L 45/22* (2013.01); *H04L 45/38* (2013.01); *H04L 43/12* (2013.01)

(58) Field of Classification Search
CPC ............. H04L 41/0668; H04L 41/0695; H04L 41/084; H04L 41/0846; H04L 41/22; H04L 43/026; H04L 43/12; H04L 45/38; H04L 47/10
See application file for complete search history.

(56) References Cited

U.S. PATENT DOCUMENTS

| | | | |
|---|---|---|---|
| 7,610,375 B2 | 10/2009 | Portolani et al. | |
| 7,924,720 B2 | 4/2011 | Wackerly | |
| 7,941,562 B2 | 5/2011 | Cheng et al. | |
| 8,099,521 B2 * | 1/2012 | Reed ................ | G06F 12/0802 709/250 |
| 8,793,358 B1 * | 7/2014 | Godbole ............. | H04L 45/40 709/223 |
| 9,106,428 B2 * | 8/2015 | Matthews ........... | H04L 49/201 |

(Continued)

OTHER PUBLICATIONS

Observer, Viavisolutions.com, Tap vs. Span, Sep. 14, 2017, 2 pgs.

(Continued)

*Primary Examiner* — Alpus Hsu

(57) ABSTRACT

Bypass switch systems and methods are disclosed for in-line monitoring of network traffic. Network ports receive ingress packets from a network and transmit processed packets as egress packets back to the network. Tool ports send the ingress packets to in-line network tools and receive the processed packets back from the in-line network tools. Tap output ports operate in a first configuration setting to output copies of ingress packets received by a network port and in a second configuration setting to output copies of processed packets transmitted as egress packets by a network port. For one embodiment, copies of ingress packets received by a network port are output through one tap output port, and copies of processed packets transmitted as egress packets by a network port are output through another tap output port. These packets copies are then analyzed to evaluate the operation of the in-line tools.

18 Claims, 6 Drawing Sheets

(56) References Cited

U.S. PATENT DOCUMENTS

| | | | |
|---|---|---|---|
| 9,231,892 B2* | 1/2016 | Baphna | H04L 49/70 |
| 9,485,188 B2* | 11/2016 | Birke | H04L 47/621 |
| 9,571,292 B2* | 2/2017 | Basso | H04L 47/62 |
| 9,674,090 B2* | 6/2017 | Caulfield | H04L 47/12 |
| 9,794,807 B2* | 10/2017 | Bennett | H04W 24/04 |
| 9,832,030 B2* | 11/2017 | Basso | H04L 47/62 |
| 9,843,460 B2* | 12/2017 | Sufleta | H04L 12/56 |
| 9,912,575 B2* | 3/2018 | Sufleta | H04L 45/02 |
| 9,960,953 B2* | 5/2018 | Sufleta | H04L 41/0654 |
| 2005/0147032 A1* | 7/2005 | Lyon | H04L 47/10 370/229 |
| 2006/0053491 A1 | 3/2006 | Khuti et al. | |
| 2007/0071182 A1* | 3/2007 | Elder | H04M 11/007 379/45 |
| 2012/0198441 A1* | 8/2012 | Mahdavi | G06F 9/455 718/1 |
| 2016/0285744 A1* | 9/2016 | Panchagnula | H04L 45/24 |
| 2017/0214566 A1 | 7/2017 | Sufleta | |

OTHER PUBLICATIONS

Ixia, White Paper, "External Bypass Switches", Rev. B, Dec. 2015, 5 pgs.

* cited by examiner

BYPASS SWITCH WITH EVALUATION MODE FOR IN-LINE MONITORING OF NETWORK TRAFFIC

TECHNICAL FIELD

The disclosed embodiments relate to monitoring of network traffic and, more particularly, to monitoring network traffic within in-line monitoring systems.

BACKGROUND

Packet-based communication networks continue to grow in importance, and it is often desirable to monitor network traffic associated with these packet-based networks on an ongoing basis. For such network traffic monitoring, in-line network tools are often placed between two network nodes such that the network traffic flows from one network node through the in-line network tool to another network node.

Deployment of an in-line network tool between network nodes within a network, however, adds a risk of the in-line network tool becoming a point of failure. To address or eliminate this potential point of failure, the deployment can include a bypass switch that is placed between the network and the in-line network tool. The bypass switch operates in a bypass "OFF" mode to route network traffic through the in-line network tool and operates in a bypass "ON" mode to route network traffic directly between network nodes without passing through the in-line network tool. For many implementations, the bypass switch operates to bypass the in-line network tool in the event of a tool failure thereby allowing the in-line network tool to monitor and inspect network traffic while still protecting the network traffic in the event of a tool failure. In this way, bypass switches provide fail-safe, in-line protection that safeguards a network with automated failover protection, preventing temporary tool outages from escalating into costly network outages. Bypass switches thereby provide a reliable separation point between the network and security layers for in-line monitoring of network traffic.

A bypass switch is typically implemented as a passive device that maintains traffic flow when the in-line monitoring tool (e.g., intrusion prevention system (IPS) and/or other network tool) is not available. There are two basic implementations for bypass switches: internal and external. Internal bypass is performed as a function of an in-line security device such as an IPS. The bypass function can also be performed outside the security tool, using an external bypass switch. The bypass switch automatically detects failure events or other operational events with respect to in-line security tools and routes traffic around the security tool while issuing an alert to ensure action is taken by the network or security system administrators. Internal bypass switches often have limited functionality, while external bypass switches often include more robust protection.

In addition to this core functionality of the bypass switch, existing bypass switches can also provide mirrored copies of received network traffic to out-of-band tools or other processing nodes. In particular, existing bypass switches can capture network traffic received by a network port of a bypass switch and send this received network traffic through a tap output port to an out-of-band tool for further inspection or processing.

FIG. 1A (Prior Art) provides a block diagram of an example embodiment 100 for a prior bypass switch 112 connected in-line between network nodes 102 and 104 where the bypass switch 112 is operating in bypass "OFF" mode. For this bypass "OFF" operational mode, the network traffic flowing through the network node 102/104 passes through the bypass switch 112 and also through the in-line tool 110. In particular, the network traffic 106 flowing through the first network node (N1) 102 includes network packets 130 and processed packets 136. The bypass switch 112 receives network packets 130 as ingress packets from the first network node (N1) 102 at a network port 114, and these network packets 130 are forwarded to tool port 118 before being transmitted to the in-line tool 110. After processing by the in-line tool 110, processed packets 132 are sent back to the bypass switch 112 and received at tool port 120. The processed packets 132 are then forwarded to the network port 116 before being transmitted as egress packets to the second network node 104 as part of network traffic 108. Similarly, the network traffic 108 flowing through the second network node (N2) 104 includes network packets 134 and processed packets 132. The bypass switch 112 receives network packets 134 as ingress packets from the second network node (N2) 104 at a network port 116, and these network packets 134 are forwarded to tool port 120 before being transmitted to the in-line tool 110. After processing by the in-line tool 110, processed packets 136 are sent back to the bypass switch 112 and received at tool port 120. The processed packets 132 are then forwarded to the network port 114 before being transmitted as egress packets to the first network node 102 as part of network traffic 106. The in-line tool 110 analyzes the network packets 130/134 and can provide various monitoring and/or security functions. For example, the in-line tool 110 can be an intrusion prevention system (IPS) that blocks packets representing network threats. Other in-line tools and related processing can also be used.

As indicated above, the bypass switch 112 can be configured to provide copies of network packets 130/134 received as ingress packets by the network nodes 102/104 through tap output ports (TAP-A, TAP-B) 122/123. For example, network packets 130 received as ingress packets by the first network node (N1) 102 can be copied, as indicated by capture node 124, and forwarded to the tap output port (TAP-A) 122. Similarly, the network packets 134 received as ingress packets by the second network node (N1) 104 can be copies, as indicated by capture node 126, and then forwarded to the tap output port (TAP-B) 123. The copied network packets 138/139 are output by the tap output ports 122/123 and can be received by an out-of-band tool (T1) 128 connected to the tap output port 122 and an out-of-band tool (T2) 129 connected to the tap output port 123.

FIG. 1B (Prior Art) provides a block diagram of an example embodiment 150 for a prior bypass switch 112 connected in-line between network nodes 102 and 104 where the bypass switch 112 is operating in bypass "ON" mode. For this bypass "ON" operational mode, the network traffic flowing through the network node 102/104 passes through the bypass switch 112 but not through the in-line tool 110. In particular, the network traffic 106 flowing through the first network node (N1) 102 includes network packets 130 and network packets 134. The bypass switch 112 receives network packets 130 as ingress packets from the first network node (N1) 102 at a network port 114, and these network packets 130 bypass the in-line tool 110 and are forwarded directly to network port 116. The network packets 130 are then output as egress packets to the second network node (N2) 104. Similarly, the network traffic 108 flowing through the second network node (N2) 104 includes network packets 134 and network packets 130. The bypass switch 112 receives network packets 134 as ingress packets from the second network node (N2) 104 at a network port 116, and these network packets 134 bypass the in-line tool 110 and are forwarded directly to network port 114. The network packets 134 are then output as egress packets to the first network node (N1) 102. As above, the bypass switch 112 can be configured to provide copies of network packets 130/134 received as ingress packets by the network nodes 102/104 through tap output ports (TAP-A, TAP-B) 122/123 and can be received by an out-of-band tool (T1) 128 connected to the tap output port 122 and an out-of-band tool (T2) 129 connected to the tap output port 123.

SUMMARY

Bypass switch systems and methods are disclosed for in-line monitoring of network traffic. Network ports receive ingress packets from a network and transmit processed packets as egress packets back to the network. Tool ports send the ingress packets to in-line network tools and receive the processed packets back from the in-line network tools. Tap output ports operate in a first configuration setting to output copies of ingress packets received by a network port and in a second configuration setting to output copies of processed packets transmitted as egress packets by a network port. For one embodiment, copies of ingress packets received by a network port are output through one tap output port, and copies of processed packets transmitted as egress packets by a network port are output through another tap output port. These packets copies are then analyzed to evaluate the operation of the in-line tools. Various embodiments are disclosed and different features and variations can be implemented and utilized.

For one embodiment, a bypass switch for in-line monitoring of network packets is disclosed including network ports configured to receive ingress packets from a network and to transmit processed packets as egress packets back to the network; tool ports configured to receive the ingress packets from the network ports, to send the ingress packets to one or more in-line network tools, and to receive the processed packets back from the one or more in-line network tools; and tap output ports where each tap output port is configured to operate in a first configuration setting to receive and output copies of ingress packets received by a selected one of the network ports and in a second configuration setting to receive and output copies of processed packets transmitted as egress packets by a selected one of the network ports.

In additional embodiments, the tool ports are configured to be bypassed in a bypass mode of operation. In further embodiments, a first tap output port is configured to receive and output copies of ingress packets received by a first network port, and a second tap output port is configured to receive and output copies of processed packets transmitted as egress packets by a second network port. In still further embodiments, a first tap output port is configured to receive and output copies of processed packets transmitted as egress packets by a first network port, and a second tap output port is configured to receive and output copies of processed packets transmitted as egress packets by a second network port.

In additional embodiments, the bypass switch includes a switch fabric configured to route the ingress packets, the egress packets, the copies of the ingress packets, and the copies of the processed packets among the network ports, the tool ports, and the tap output ports. In further embodiments, the switch fabric is configured to automatically route packets based upon configuration information. In still further embodiments, the bypass switch includes a user interface configured to allow a user to determine the configuration information for the switch fabric, and a controller configured to apply the configuration information to the switch fabric.

For one embodiment, a system for in-line monitoring of network packets is disclosed including one or more in-line network tools, a bypass switch, and one or more out-of-band network tools coupled to tap output ports for the bypass switch. The bypass switch includes network ports configured to receive ingress packets from a network and to transmit processed packets as egress packets back to the network; tool ports configured to receive the ingress packets from the network ports, to send the ingress packets to the one or more in-line network tools, and to receive the processed packets back from the one or more in-line network tools; and tap output ports where each tap output port is configured to operate in a first configuration setting to receive and output copies of ingress packets received by a selected one of the network ports and to operate in a second configuration setting to receive and output copies of processed packets transmitted as egress packets by a selected one of the network ports.

In additional embodiments, a first tap output port is configured to receive and output copies of ingress packets received by a first network port, and a second tap output port is configured to receive and output copies of processed packets transmitted as egress packets by a second network port. In further embodiments, at least one out-of-band tool is coupled to the first tap output port and to the second tap output port. In still further embodiments, the at least one out-of-band tool is configured to compare the copies of the ingress packets output by the first tap output port to copies of the processed packets output by the second tap output port to evaluate operation of the one or more in-line network tools.

In additional embodiments, the tool ports within the bypass switch are configured to be bypassed in a bypass mode of operation for the bypass switch. In further embodiments, the bypass switch includes one or more components configured to operate within a virtualization layer running on a host server.

In one embodiment, a method for in-line monitoring of network packets including at network ports for a bypass switch, receiving ingress packets from a network and transmitting processed packets as egress packets back to the network; at tool ports for the bypass switch, receiving the ingress packets from the network ports, sending the ingress packets to one or more in-line network tools, and receiving the processed packets back from the one or more in-line network tools; and at each of a plurality of tap output ports for the bypass switch, operating in a first configuration setting to receive and output copies of ingress packets received by a selected one of the network ports, and operating in a second configuration setting to receive and output copies of processed packets transmitted as egress packets by a selected one of the network ports.

For additional embodiments, the method further comprises bypassing the tool ports in a bypass mode of operation. In further embodiments, a first tap output port is configured to receive and output copies of ingress packets received by a first network port, and a second tap output port is configured to receive and output copies of processed packets transmitted as egress packets by a second network port. In still further embodiments, the method further includes comparing the copies of the ingress packets output by the first tap output port to copies of the processed packets output by the second tap output port to evaluate operation of the one or more in-line network tools.

In additional embodiments, the method further includes routing the ingress packets, the egress packets, the copies of the ingress packets, and the copies of the processed packets among the network ports, the tool ports, and the tap output ports with a switch fabric. In further embodiments, the routing by the switch fabric is based upon configuration information. In still further embodiments, the method further includes providing a user interface to allow a user to determine the configuration information for the switch fabric, and applying the configuration information to the switch fabric.

Different or additional features, variations, and embodiments can be implemented, if desired, and related systems and methods can be utilized, as well.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION

Figure 1A:
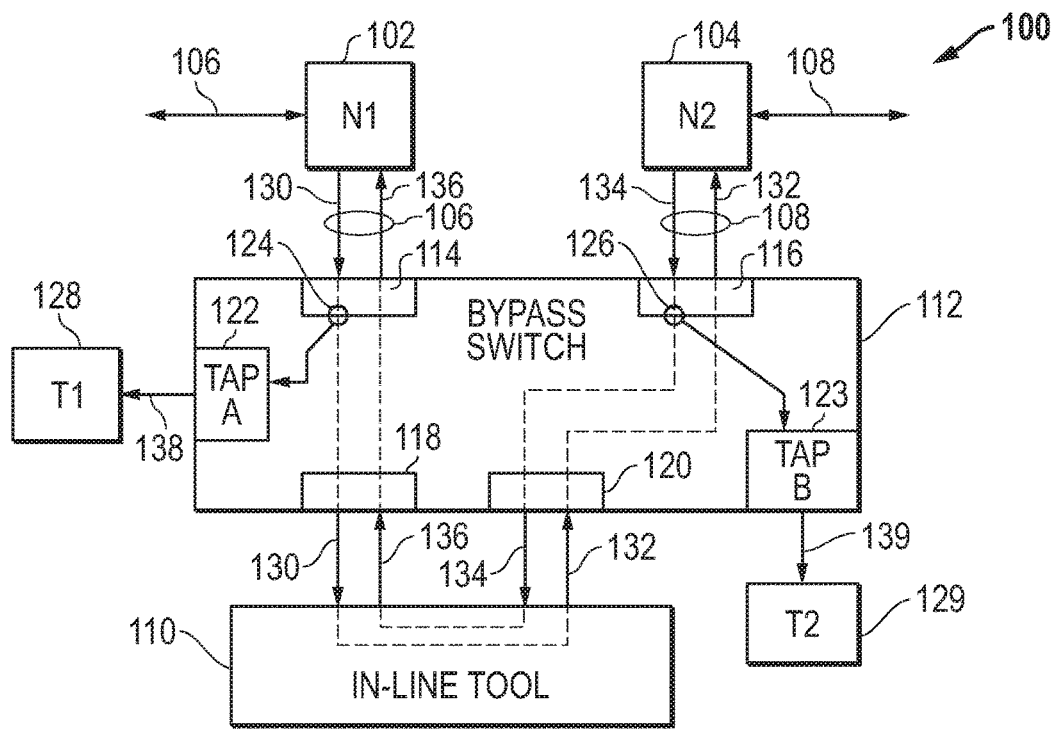
FIG. 1A (Prior Art) provides a block diagram of an example embodiment for a prior bypass switch connected in-line between network nodes where the bypass switch is operating in bypass "OFF" mode and outputs copies of ingress packets received from the network.
Figure 1B:
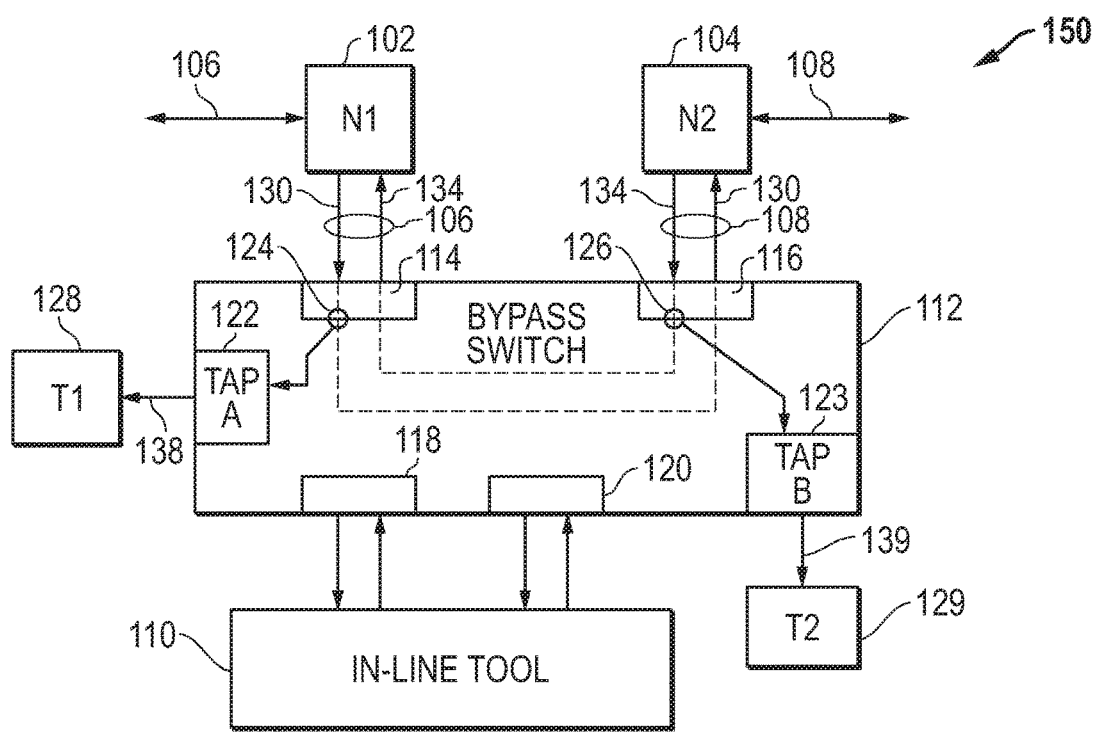
FIG. 1B (Prior Art) provides a block diagram of an example embodiment for a prior bypass switch connected in-line between network nodes where the bypass switch is operating in bypass "ON" mode and outputs copies of ingress packets received from the network.

Bypass switch systems and methods are disclosed for in-line monitoring of network traffic. Various embodiments are disclosed and different features and variations can be implemented and utilized.

The disclosed embodiments provide bypass switches with expanded functionality that enables the bypass switches to mirror traffic to out-of-band tools from multiple points in the bypass switches. For the disclosed embodiments, the bypass switch is configurable to mirror packet traffic received as ingress packets from the network and/or transmitted as egress packets back to the network (e.g., after having traveled through one or more in-line tools). One benefit enabled by this new functionality is an evaluation mode for connected tools. For example, the new functionality provides an easy and convenient way to test or verify that one or more in-line tools connected to the bypass switch are performing their duties correctly. For this evaluation mode, one tap output port can be configured to mirror traffic received as ingress packets from the network, and another tap output port can be configured to mirror traffic transmitted as egress packets back to the network after passing through the one or more in-line tools. This configuration thereby provides visibility to packet traffic before and after the in-line tool has inspected and processed that packet traffic. In contrast, prior bypass switch implementations only mirror network traffic received as ingress packets directly from the network by the bypass switch before this packet traffic is passed through and processed by any in-line tool.

In operation when an evaluation of the performance of one or more in-line tools is desired to be determined, the bypass switch is configured to create copies of the processed packet traffic from the in-line tool(s) being evaluated that flows out of the bypass switch as egress packets to the network. For example, depending upon tool evaluation configurations set for the bypass switch, a switch fabric for the bypass switch can be configured to capture packets that are received as ingress packets by a network port for the bypass switch and to capture processed packets that are received from the in-line tool and transmitted back as egress packets by a network port for the bypass switch. The packet copies that are captured can be forwarded to tap output ports where they can be received and processed by one or more out-of-band tools to evaluate the operation of the in-line tool(s).

Disclosed embodiments for bypass switches are now described in more detail with respect to FIGS. 2A-B and FIGS. 3A-B. For these embodiments, a bypass switch 212 is placed in-line within a communication link between network nodes 102/104 that is carrying network traffic. When the bypass switch 212 is operating in bypass "OFF" mode, the network traffic received at network ports for the bypass switch 212 is directed to one or more in-line tools 110 and from the in-line tools 110 back to the network nodes 102/104. When the bypass switch 212 is operating in bypass "ON" mode, the received network traffic is forwarded directly back to the network nodes 102/104 while the in-line tools 110 are bypassed. The operating mode for the bypass switch 212 can be determined, for example, by internal and/or external control signals that are based upon the operating state of the in-line tools 110 and/or other parameters. For example, the bypass switch 212 can be configured to enter bypass "ON" mode when an error condition or other fault condition is detected with respect to the operation of the in-line tools 110 that can degrade network operations associated with the network traffic.

For the embodiments described herein, the bypass switch 212 can be configured to capture and forward packet copies of processed packets received from the in-line tools 110 and transmitted back as egress packets to the network nodes 102/104 in addition to packets received as ingress packets from the network nodes 102/104. These packet copies can be sent to one or more out-of-band tools that can then separately process these packet copies. This additional functionality for the bypass switch 212 allows for additional modes such as an evaluation mode where the operation of the in-line tools 110 can be evaluated by comparing ingress/egress packet copies, as described further herein.

With respect to mirrored or copied packet traffic, an out-of-band tool 210 that is connected to the bypass switch 212 can be receive inbound traffic and/or outbound traffic. For example, when configured to receive inbound traffic from a network port 102/104, the bypass switch 212 will send the out-of-band tool 210 the traffic received as ingress packets by that network port 102/104, even in the event that the bypass switch 212 detects that the in-line tool(s) 110 are no longer available and activates the bypass "ON" mode. It is assumed here that the bypass switch 212 is not set to disable upon tool failure. When configured to receive outbound traffic from a network port 102/104, the packet traffic received by the bypass switch 212 back from the in-line tool 110 (or from the last tool 110 in the case of high-availability, when multiple in-line tools 110 are chained by the bypass switch 212) is forwarded to the out-of-band tool 210 as long as the bypass switch is operating in bypass "OFF" mode. When the bypass switch 212 is coupled to a standby network node pair (e.g., a network node pair that will become active in the case the primary network link fails), the out-of-band tool 210 will receive traffic only from the active network node pair. Other variations can also be implemented while still taking advantage of the techniques described herein.

Figure 2A:
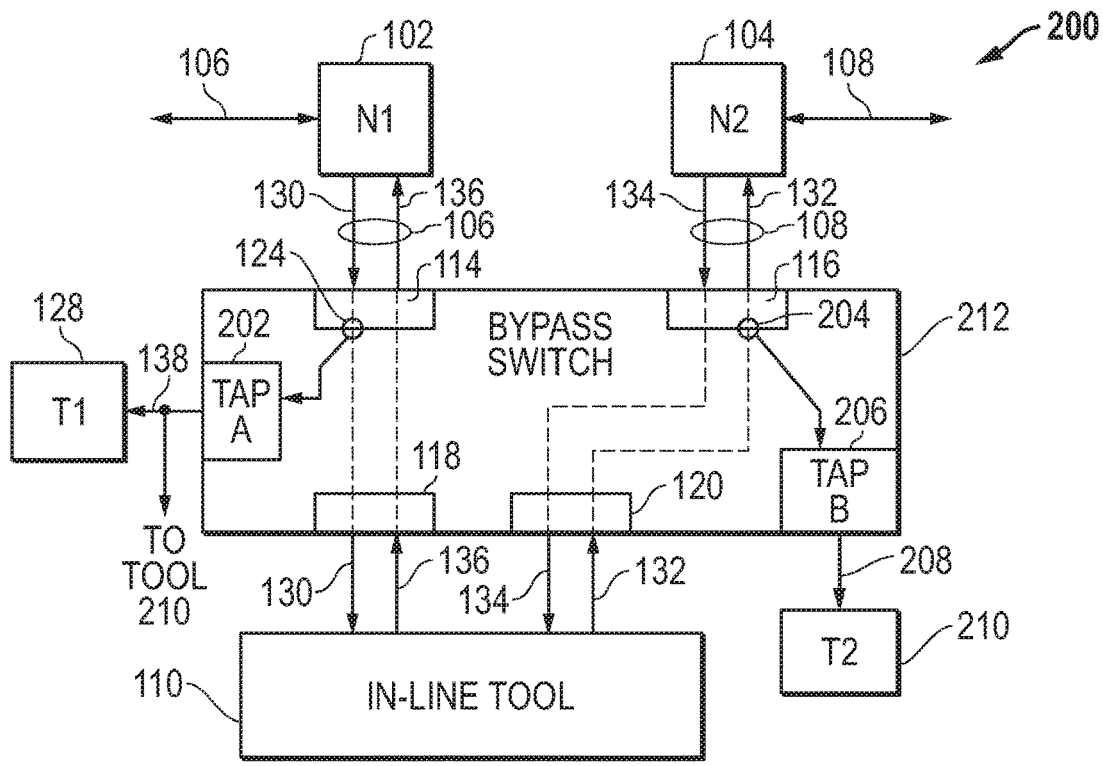
FIG. 2A provides a block diagram of an example embodiment for a bypass switch connected in-line between network nodes where the bypass switch is operating in bypass "OFF" mode and where egress packets processed by the in-line tool are copied and output by the bypass switch as well as ingress packets.

FIG. 2A provides a block diagram of an example embodiment 200 for a bypass switch 212 connected in-line between network nodes 102 and 104 where the bypass switch 212 is operating in bypass "OFF" mode and where egress packets processed by the in-line tool 110 are copied and output by the bypass switch 212. For this bypass "OFF" operational mode, embodiment 200 operates in part similar to embodiment 100 of FIG. 1A (Prior Art). The network traffic flowing through the network node 102/104 passes through the bypass switch 212 and also through the in-line tool 110. In particular, the network traffic 106 flowing through the first network node (N1) 102 includes network packets 130 and processed packets 136. The bypass switch 212 receives network packets 130 as ingress packets from the first network node (N1) 102 at a network port 114, and these network packets 130 are forwarded to tool port 118 before being transmitted to the in-line tool 110. After processing by the in-line tool 110, processed packets 132 are sent back to the bypass switch 212 and received at tool port 120. The processed packets 132 are then forwarded to the network port 116 before being transmitted as egress ports to the second network node 104 as part of network traffic 108. Similarly, the network traffic 108 flowing through the second network node (N2) 104 includes network packets 134 and processed packets 132. The bypass switch 212 receives network packets 134 as ingress packets from the second network node (N2) 104 at a network port 116, and these network packets 134 are forwarded to tool port 120 before being transmitted to the in-line tool 110. After processing by the in-line tool 110, processed packets 136 are sent back to the bypass switch 212 and received at tool port 120. The processed packets 132 are then forwarded to the network port 114 before being transmitted as egress packets to the first network node 102 as part of network traffic 106. The in-line tool 110 analyzes the network packets 130/134 and can provide various monitoring and/or security functions. For example, the in-line tool 110 can be an intrusion prevention system (IPS) that blocks packets representing network threats. It is also noted that additional network nodes, in-line tools, and out-of-band tools can also be coupled to the bypass switch 212 through additional network ports, tool ports, and tap output ports, respectively.

As with embodiment 100 in FIG. 1A (Prior Art), the bypass switch 212 in FIG. 2A can also be configured to provide copies of network packets 130/134 received from network nodes 102/104 through tap output ports 202/206. For example, network packets 130 received as ingress packets from the first network node (N1) 102 can be copied, as indicated by capture node 124, and forwarded to the tap output port (TAP-A) 202. The packet copies 138 are output by the tap output port (TAP-A) 202 and can be received by an out-of-band tool (T1) 128 connected to the tap output port 202.

In contrast with embodiment 100 in FIG. 1A (Prior Art), the bypass switch 212 in FIG. 2A can further be configured to provide copies of processed network packets 132/136 received from the in-line tool 110 through tap output ports 202/206 and output as egress packets by the bypass switch 212. For example, the processed packets 132 received from the in-line tool 110 and output as egress packets by network node 116 can be copied, as indicated by capture node 204, and then forwarded to the tap output port (TAP-B) 206. The packet copies 208 are output by the tap output port 206 and can be received by an out-of-band tool (T2) 210 connected to the tap output port 206. The out-of-band tool (T2) 210 can also receive the packet copies 138 for the network packets 130 output by the tap output port 122. As such, the packet copies 138/208 can be compared or otherwise analyzed by tool 210 to evaluate whether the in-line tool 110 is operating correctly with respect to its security and/or other processing features.

Figure 2B:
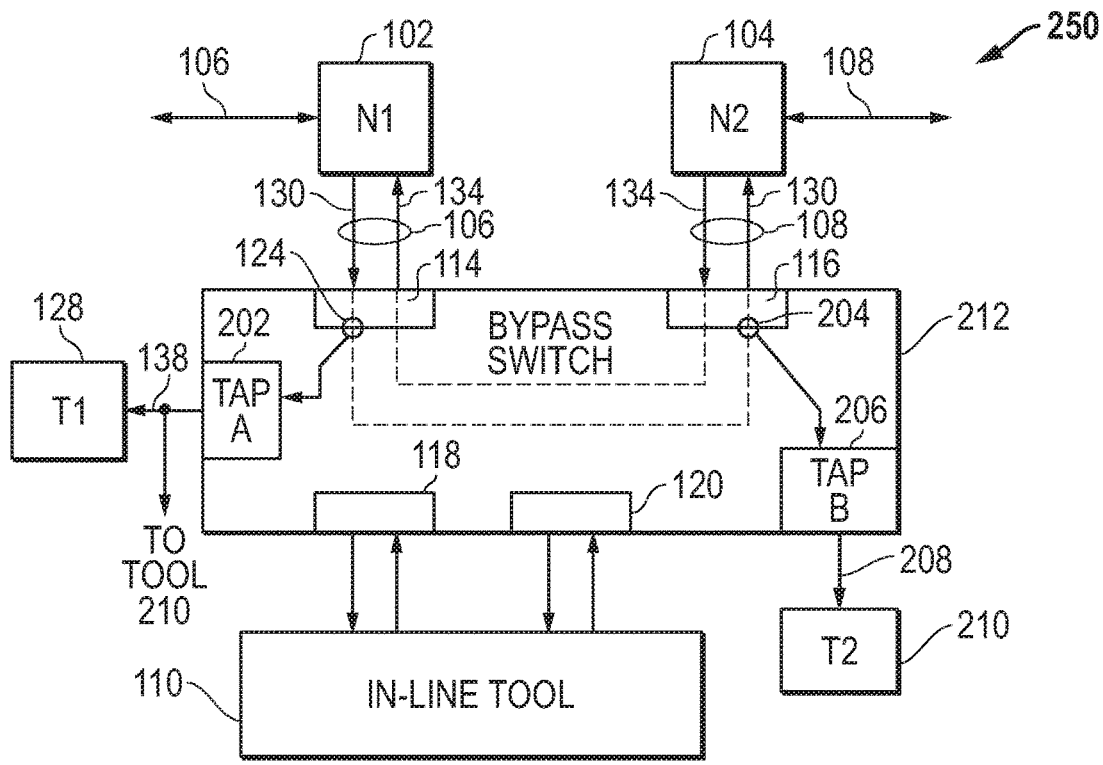
FIG. 2B provides a block diagram of an example embodiment for a bypass switch connected in-line between network nodes where the bypass switch is operating in bypass "ON" mode and where egress packets are copied and output by the bypass switch as well as ingress packets.

FIG. 2B provides a block diagram of an example embodiment 250 for a bypass switch 212 connected in-line between network nodes 102 and 104 where the bypass switch 212 is operating in bypass "ON" mode and where egress packets are copied and output by the bypass switch 212. For this bypass "ON" operational mode, the network traffic flowing through the network node 102/104 passes through the bypass switch 212 but not through the in-line tool 110. In particular, the network traffic 106 flowing through the first network node (N1) 102 includes network packets 130 and network packets 134. The bypass switch 212 receives network packets 130 as ingress packets from the first network node (N1) 102 at a network port 114, and these network packets 130 bypass the in-line tool 110 and are forwarded directly to network port 116. The network packets 130 are then output as egress packets to the second network node (N2) 104. Similarly, the network traffic 108 flowing through the second network node (N2) 104 includes network packets 134 and network packets 130. The bypass switch 212 receives network packets 134 as ingress packets from the second network node (N2) 104 at a network port 116, and these network packets 134 bypass the in-line tool 110 and are forwarded directly to network port 114. The network packets 134 are then output as egress packets to the first network node (N1) 102.

As with embodiment 200 above for FIG. 2A, the bypass switch 212 can be configured to provide copies of network packets 130/134 received as ingress packets from network nodes 102/104 through tap output ports 202/206, and the bypass switch 212 can be further configured to provide copies of network packets 130/134 transmitted as egress packets by bypass switch 212 through tap ports 202/206. For the embodiment 250 depicted, copies of ingress packets received by network port 114 are received and output by tap output port 202, and copies of egress packets transmitted by network port 116 are received and output by tap output port 206. The out-of-band tool (T2) 210 can receive the packet copies 138/208 output by the tap output ports 202/206 and then compare or otherwise analyze them to evaluate whether the bypass switch 212 is operating correctly with respect to its bypass "ON" mode to forward all received network packets while bypassing in-line tool 110.

Figure 3A:
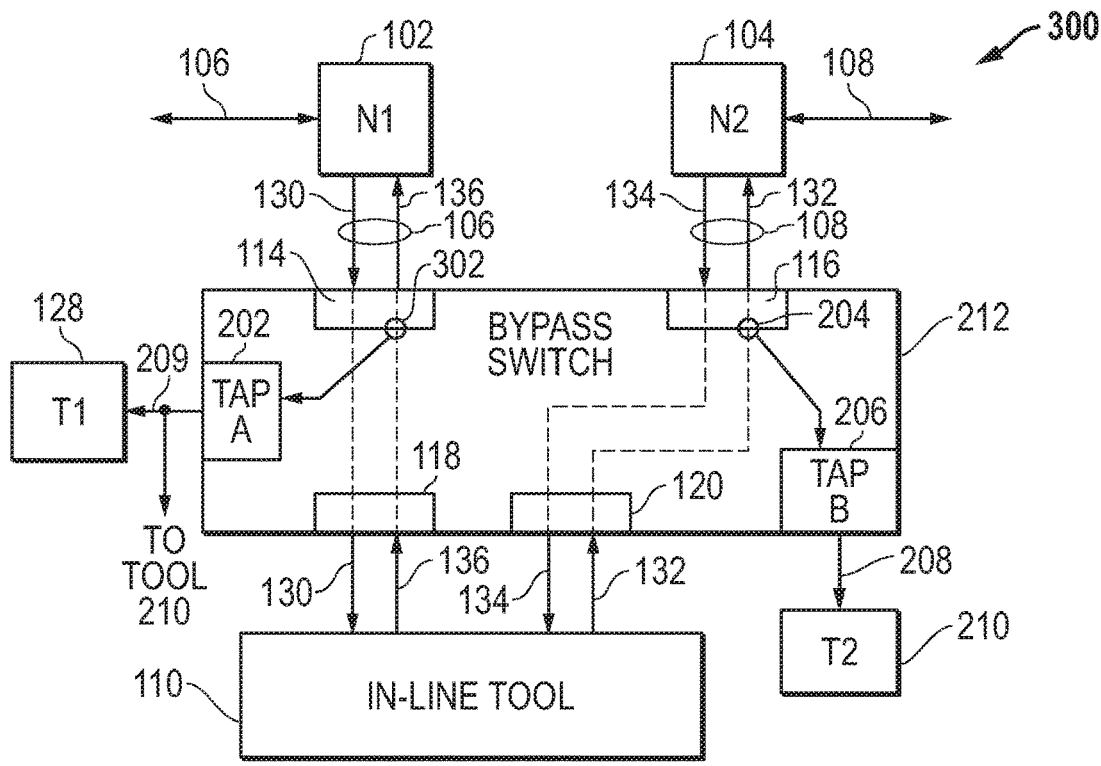
FIG. 3A provides a block diagram of an example embodiment for a bypass switch similar to the embodiment of FIG. 2A that is operating in bypass "OFF" mode where copies of egress packets from an additional network port are also output through a tap output port.

FIG. 3A provides a block diagram of an example embodiment 300 for a bypass switch 212 similar to embodiment 200 of FIG. 2A that is operating in bypass "OFF" mode except that copies of processed packets 136 are also output by the bypass switch 212. For embodiment 300, processed packets 136 received from the in-line tool 110 and output as egress packets are copied, as indicated by capture node 302, and forwarded to the tap output port (TAP-A) 202. The packet copies 209 are output by the tap output port 202 and can be received by an out-of-band tool (T1) 128 connected to the tap output port 202.

Figure 3B:
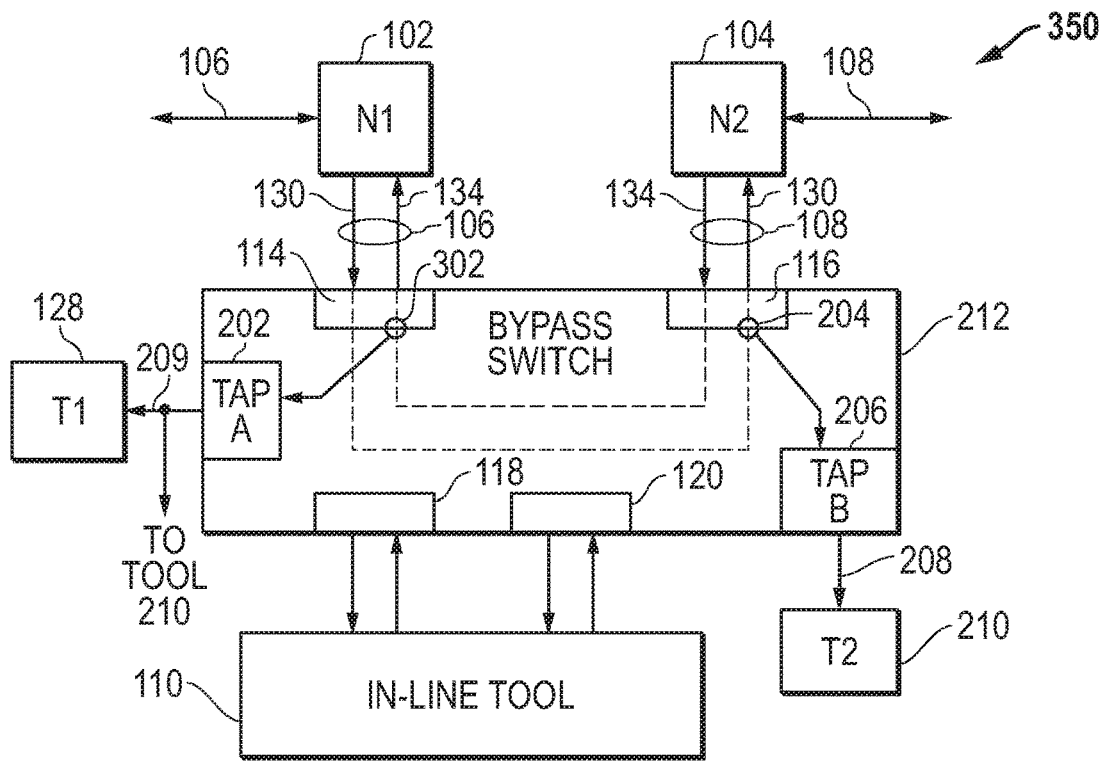
FIG. 3B provides a block diagram of an example embodiment for a bypass switch similar to the embodiment of FIG. 2B that is operating in bypass "OFF" mode where copies of egress packets from an additional network port are also output through a tap output port.

FIG. 3B provides a block diagram of an example embodiment 350 for a bypass switch 212 similar to embodiment 250 of FIG. 2B that is operating in bypass "ON" mode except that copies of packets 134 are also output by the bypass switch 212. For embodiment 350, network packets 134 received from the second network node (N2) 104 and output as egress packets are copied, as indicated by capture node 302, and then forwarded to the tap output port (TAP-A) 202. The packet copies 209 are output by the tap output port 202 and can be received by an out-of-band tool (T1) 128 connected to the tap output port 202.

Figure 4:
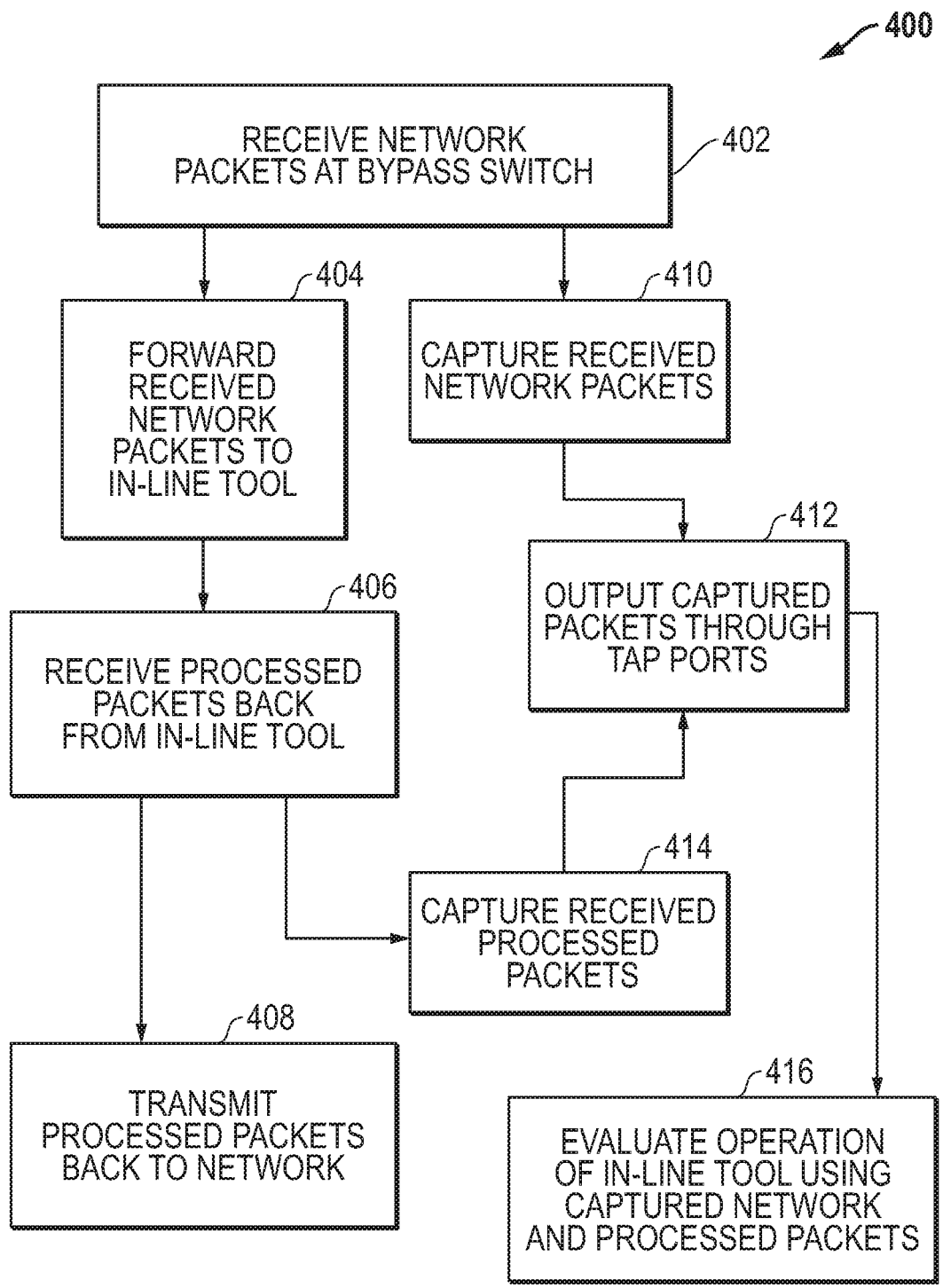
FIG. 4 provides a flow diagram of an example embodiment for operating a bypass switch in bypass "OFF" mode to capture processed packets being transmitted as egress packets by the bypass switch in addition to network packets being received as ingress packets by the bypass switch.

FIG. 4 provides a flow diagram of an example embodiment 400 for operating a bypass switch 212 in bypass "OFF" mode to capture processed packets 132/136 being transmitted as egress packets by the bypass switch 212 in addition to network packets being received as ingress packets by the bypass switch 212. In block 402, network packets 130/134 are received as ingress packets by the bypass switch 212. In block 404, the received network packets 130/134 are forwarded to in-line tool 110. The received network packets 130/134 are also captured in block 410, and then output as copies through tap output ports in block 412. In block 406, processed packets 132/136 are received back from the in-line tool 110. In block 408, the processed packets 132/136 are transmitted as egress packets back to the network through network ports 114/116. The processed packets 132/136 are also captured in block 414, and then output as copies through tap output ports in block 412. In block 416, the operation of the in-line tool 110 is evaluated using the captured network packets 130/134 and the captured processed packets 132/136. For example, the captured processed packets 132/126 can be compared to the captured network packets 130/134 to determine if the in-line tool 110 is operating correctly to provide its function, such as for example, intrusion prevention and/or other network security or monitoring functions.

Figure 5:
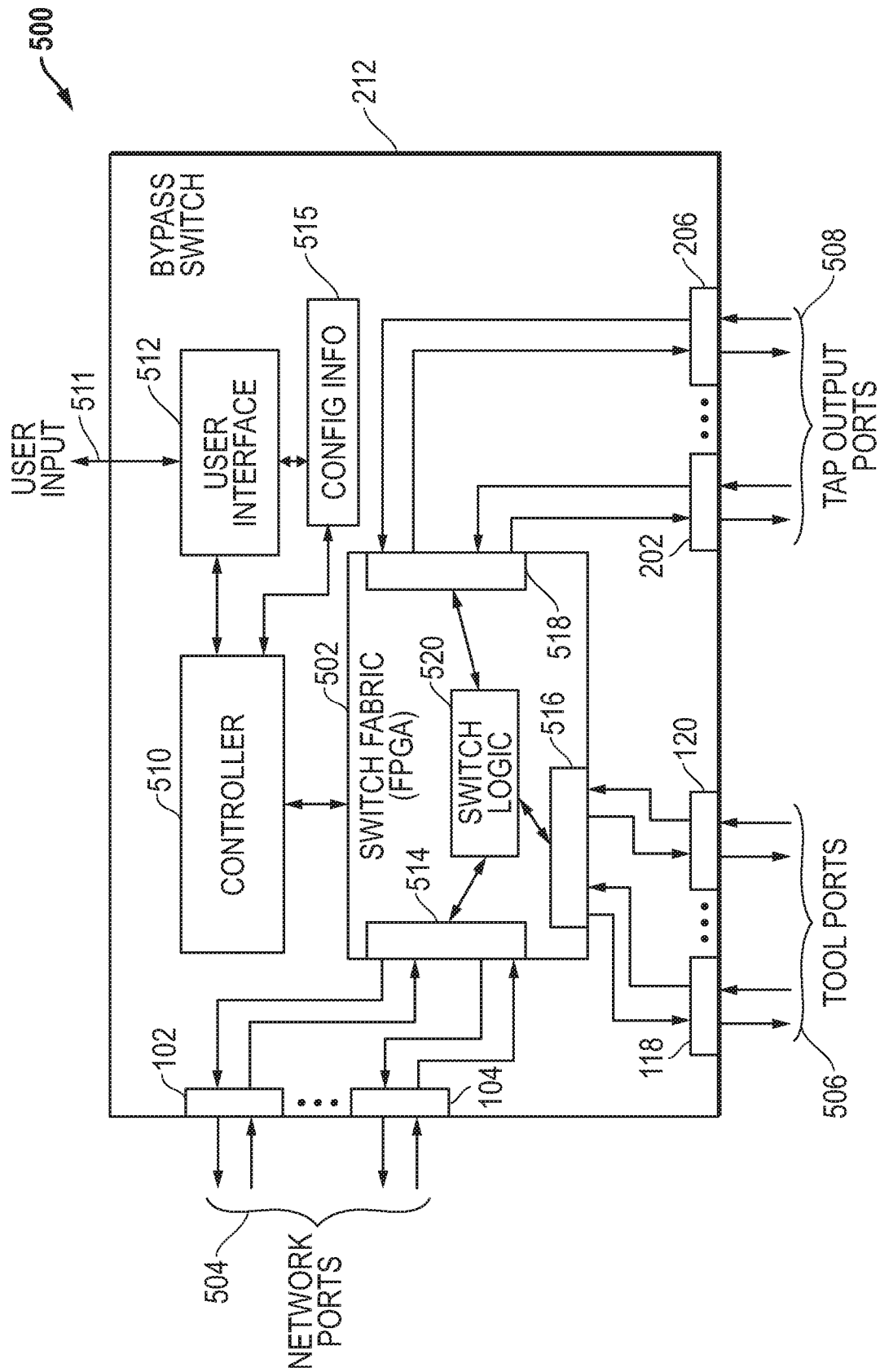
FIG. 5 is a block diagram of an example embodiment for a bypass switch including a switch fabric that provides configurable packet forwarding among the network ports, the tool ports, and the tap output ports.

FIG. 5 is a block diagram of an example embodiment 500 for a bypass switch 212 including a switch fabric 502 that provides configurable packet forwarding among the network ports 504, the tool ports 506, and the tap output ports 508. The network ports 504 include a plurality of network ports 102 . . . 104. The tool ports 506 include a plurality of tool ports 118 . . . 120. The tap output ports 508 include a plurality of tap output ports 202 . . . 206. The switch fabric 502 includes one or more buffers 514 that store packets for the network ports 504, one or more buffers 516 that store packets for the tool ports 506, and one or more buffers 518 that store packets for the tap output ports 508. These buffers 514, 516, and 518 are coupled to the switch logic 520 that provides routing among the buffers 514, 516, and 518 based upon configuration settings applied by controller 510. The configuration settings applied to switch fabric 502 can in turn be stored as configuration information 515 programmed through user inputs 511 configured through user interface 512. For example, for each of the tap output ports 508, the configuration information 515 can include settings that configure each the tap output ports 508 to receive copies of network packets received as ingress packets from a selected one of the network ports 504 or to receive copies of processed packets transmitted as egress packets by a selected one of the network ports 504. The configuration information 515, for example, can include tables or records that identify the packet copies that are to be received and output by each of the tap output ports 508 for the bypass switch 212. It is further noted that the configuration information 515 can be set and stored in other ways while still takin advantage of the bypass switch techniques described herein.

The TABLE below provides one example embodiment for configuration settings stored as configuration information 515 and applied by the controller 510 to the switch fabric 502 to determine how packet copies are routed from the network ports 504 to the tap output ports 508. For each tap output port 508 for the bypass switch 212, a setting is made to determine whether copies of ingress packets or copies of egress packets are captured and routed by the switch fabric 502 to that tap output port from a selected network port 504. For the particular embodiment shown, a configuration setting is set such that tap output port 202 receives copies of ingress packets from network port 102, and a configuration setting is set such that tap output port 206 receives copies of egress packets from the network port 104. This TABLE embodiment for the configuration information 515, therefore, includes settings that configure each of the tap output ports 508 to receive copies of network packets received as ingress packets from a selected one of the network ports 504 or to receive copies of processed packets transmitted as egress packets by a selected one of the network ports 504. As indicated above, the configuration information 515 can be set and stored in other ways while still taking advantage of the bypass switch techniques described herein.

TABLE

EXAMPLE CONFIGURATION SETTINGS FOR SWITCH FABRIC TO ROUTE PACKET COPIES TO TAP OUTPUT PORTS

| Tap Output Ports 508 | Ingress Packets for Network Ports 504 | | Egress Packets for Network Ports 504 | |
|---|---|---|---|---|
| | 102 | . . . 104 | 102 | . . . 104 |
| 202 | X | | | |
| . . . | . . . | . . . | . . . | . . . |
| 206 | | | | X |

It is noted that the switch fabric 502 can be implemented using one or more FPGAs (field programmable gate arrays). The controller 510 and/or other processing nodes or components described herein can be implemented using one or more programmable integrated circuits that are programmed to provide the functionality described herein. For example, one or more processors (e.g., microprocessor, microcontroller, central processing unit, etc.), configurable logic devices (e.g., CPLD (complex programmable logic device), FPGA (field programmable gate array), etc.), and/or other programmable integrated circuits can be programmed with software or other programming instructions to implement the functionality described herein. It is further noted that the software or other programming instructions can be stored in one or more non-transitory computer-readable mediums (e.g., memory storage devices, FLASH memory, DRAM memory, reprogrammable storage devices, hard drives, floppy disks, DVDs, CD-ROMs, etc.), and the software or other programming instructions when executed by the programmable integrated circuits cause the programmable integrated circuits to perform the processes, functions, and/or capabilities described herein.

Figure 6:
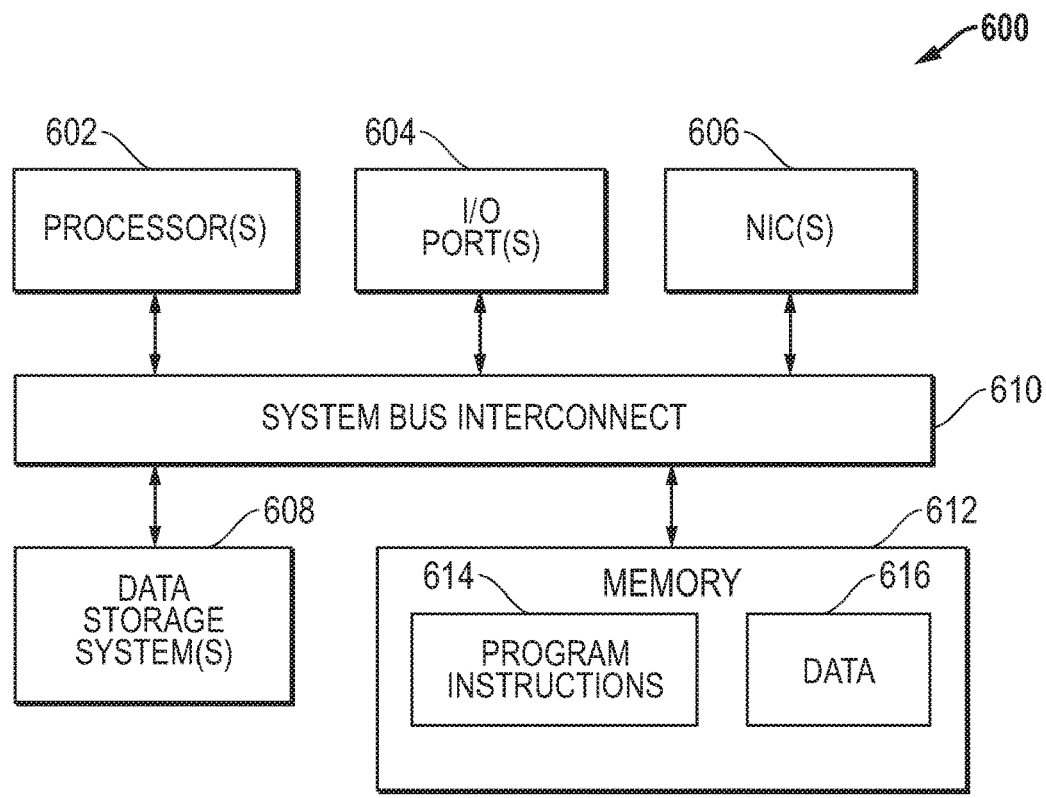
FIG. 6 is a block diagram of an example embodiment for a computing platform that can be used to implement one or more of the components described herein.

FIG. 6 is a block diagram of an example embodiment for a computing platform 600 that can be used to implement one or more of the components described herein. The computing platform 600 includes one or more processors 602 or other programmable integrated circuit(s) that are programmed with code or logic instructions to perform the operations and functions described herein. In addition to processors 602 or other programmable integrated circuits, the computing platform 600 can also include one or more input/output (I/O) ports 604, one or more network interface cards (NICs) 606, one or more data storage systems 608, and memory 612 coupled to communicate with each other through a system bus interconnect 610. The memory 612 can include one or more memory devices that store instructions 614 and/or data 616 during operation of the computing platform 600. For example during operation, one or more of the processors 602 or other programmable integrated circuits can load software or program instructions stored in the data storage systems 608 into the memory 612 and then execute the software or program instructions to perform the operations and functions described herein.

It is noted that the memory 612 and the data storage system(s) 608 can be implemented using any desired non-transitory tangible computer-readable medium, such as for example, one or more data storage devices, flash memories, random access memories, read only memories, programmable memory devices, reprogrammable storage devices, hard drives, floppy disks, DVDs, CD-ROMs, and/or any other non-transitory tangible computer-readable data storage mediums. It is further noted that the programmable integrated circuits can include one or more processors (e.g., central processing units (CPUs), controllers, microcontrollers, microprocessors, hardware accelerators, ASICs (application specific integrated circuit), and/or other integrated processing devices) and/or one or more programmable logic devices (e.g., CPLDs (complex programmable logic devices), FPGAs (field programmable gate arrays), PLAs (programmable logic array), reconfigurable logic circuits, and/or other integrated logic devices). Other variations and processing platforms can also be implemented while still taking advantage of the hash-based selection of network packets for packet flow sampling in network communication systems.

Figure 7:
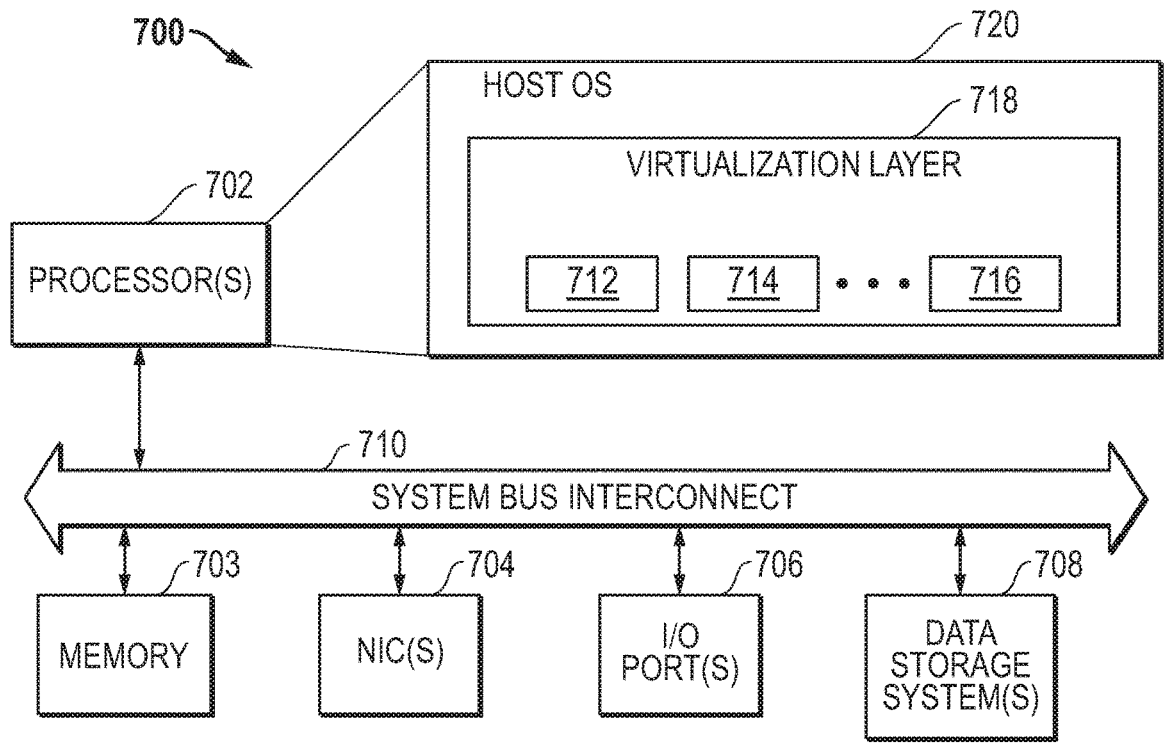
FIG. 7 is a block diagram of an example embodiment for a host server that can provide a virtual processing environment for virtual nodes and/or other virtual processing nodes.

FIG. 7 is a block diagram of an example embodiment 700 for a host server that can provide a virtual processing environment for virtual processing nodes that implement one or more of the functions or components described herein. For the example embodiment depicted, the host server 700 includes one or more processors 702 or other programmable integrated circuits that are programmed to provide a virtualization layer 718 (e.g., virtual machine hypervisor, container engine, etc.) for one or more virtual processing nodes 712, 714, . . . 716 that can implement one or more of the components described herein. The processors 702 or other programmable integrated circuit(s) can be programmed with software code or logic instructions stored in the data storage systems 708 to perform the operations and functions described herein. In addition to the processors 702 or other programmable integrated circuits, the host server 700 also includes one or more network interface cards (NICs) 704, one or more input/output (I/O) ports 706, one or more data storage systems 708, and memory 703 coupled to communicate with each other through a system bus interconnect 710. In operation, virtualization layer 718 and the virtual processing nodes 712, 714, . . . 716 run on top of a host operating system (OS) 720. For example, the host operating system 720, the virtualization layer 718, and the virtual nodes 712, 714, . . . 716 can be initialized, controlled, and operated by the processors or programmable integrated circuits 702 which load and execute software code and/or programming instructions stored in the data storage systems 708 to perform the functions described herein. The virtualization layer 718 for the virtual platforms can be implemented using any desired virtualization layer (e.g., hypervisor, container engine, etc.) that provides a virtual processing environment for the virtual processing nodes such as virtual machines (VMs) or instances. For one embodiment, the container engine can be implemented as a Docker container engine for a Linux operating system configured to execute Docker containers. Other variations could also be implemented.

It is noted that the memory 703 can include one or more memory devices that store program instructions and/or data used for operation of the host server 700. For example during operation, one or more of the processors 702 or other programmable integrated circuits can load software or program instructions stored in the data storage systems 708 into the memory 703 and then execute the software or program instructions to perform the operations and functions described herein. It is further noted that the data storage system(s) 708 and the memory 703 can be implemented using one or more non-transitory tangible computer-readable mediums, such as for example, data storage devices, FLASH memory devices, random access memory (RAM) devices, read only memory (ROM) devices, other programmable memory devices, reprogrammable storage devices, hard drives, floppy disks, DVDs, CD-ROMs, and/or other non-transitory data storage mediums. It is further noted that the programmable integrated circuits can include one or more processors (e.g., central processing units (CPUs), controllers, microcontrollers, microprocessors, hardware accelerators, ASICs (application specific integrated circuit), and/or other integrated processing devices) and/or one or more programmable logic devices (e.g., CPLDs (complex programmable logic devices), FPGAs (field programmable gate arrays), PLAs (programmable logic array), reconfigurable logic circuits, and/or other integrated logic devices). Other variations and processing or computing platforms can also be implemented while still taking advantage of the hash-based selection of network packets for packet flow sampling in network communication systems.

It is further noted that the functional blocks, components, systems, devices, and/or circuitry described herein can be implemented using hardware, software, or a combination of hardware and software. For example, the disclosed embodiments can be implemented using one or more programmable integrated circuits that are programmed to perform the functions, tasks, methods, actions, and/or other operational features described herein for the disclosed embodiments. The one or more programmable integrated circuits can include, for example, one or more processors and/or PLDs (programmable logic devices). The one or more processors can be, for example, one or more central processing units (CPUs), controllers, microcontrollers, microprocessors, hardware accelerators, ASICs (application specific integrated circuit), and/or other integrated processing devices. The one or more PLDs can be, for example, one or more CPLDs (complex programmable logic devices), FPGAs (field programmable gate arrays), PLAs (programmable logic array), reconfigurable logic circuits, and/or other integrated logic devices. Further, the programmable integrated circuits, including the one or more processors, can be configured to execute software, firmware, code, and/or other program instructions that are embodied in one or more non-transitory tangible computer-readable mediums to perform the functions, tasks, methods, actions, and/or other operational features described herein for the disclosed embodiments. The programmable integrated circuits, including the one or more PLDs, can also be programmed using logic code, logic definitions, hardware description languages, configuration files, and/or other logic instructions that are embodied in one or more non-transitory tangible computer-readable mediums to perform the functions, tasks, methods, actions, and/or other operational features described herein for the disclosed embodiments. In addition, the one or more non-transitory tangible computer-readable mediums can include, for example, one or more data storage devices, memory devices, flash memories, random access memories, read only memories, programmable memory devices, reprogrammable storage devices, hard drives, floppy disks, DVDs, CD-ROMs, and/or any other non-transitory tangible computer-readable mediums. Other variations can also be implemented while still taking advantage of the hash-based selection of network packets for packet flow sampling in network communication systems.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A bypass switch for in-line monitoring of network packets, comprising:
    network ports configured to receive ingress packets from a network;
    tool ports configured to receive the ingress packets from the network ports, to send the ingress packets to one or more in-line network tools, and to receive processed packets from the one or more in-line network tools, and to forward the processed packets as egress packets to the network via the network ports;
    a first capture node configured to copy the ingress packets from the network received by a first network port of the network ports and forward the copies of the ingress packets;
    a second capture node configured to copy the egress packets received by a second network port of the network ports and forward the copies of the egress packets;
    tap output ports, comprising:
        a first tap output port configurable for an evaluation mode to receive and output the copies of the ingress packets forwarded by the first capture node; and
        a second tap output port configurable for the evaluation mode to receive and output the copies of the egress packets forwarded by the second capture node.

2. The bypass switch of claim 1, wherein the tool ports are configured to be bypassed in a bypass mode of operation.

3. The bypass switch of claim 1, wherein the first tap output port is configured to operate in a first configuration setting to receive and output the copies of the ingress packets and in a second configuration setting to receive and output the copies of the egress packets.

4. The bypass switch of claim 1, further comprising a switch fabric configured to route the ingress packets, the egress packets, the copies of the ingress packets, and the copies of the egress packets among the network ports, the tool ports, and the tap output ports.

5. The bypass switch of claim 4, wherein the switch fabric is configured to automatically route the ingress packets, the egress packets, the copies of the ingress packets, and the copies of the egress packets based upon configuration information.

6. The bypass switch of claim 5, further comprising a user interface configured to allow a user to determine the configuration information for the switch fabric, and a controller configured to apply the configuration information to the switch fabric.

7. A system for in-line monitoring of network packets, comprising:
    one or more in-line network tools;
    a bypass switch, the bypass switch comprising:
        network ports configured to receive ingress packets from a network;
        tool ports configured to receive the ingress packets from the network ports, to send the ingress packets to the one or more in-line network tools, to receive processed packets from the one or more in-line network tools, and to forward the processed packets as egress packets to the network via the network ports;
        a first capture node configured to copy the ingress packets from the network received by a first network port of the network ports and forward the copies of the ingress packets;
        a second capture node configured to copy the egress packets received by a second network port of the network ports and forward the copies of the egress packets;
        tap output ports, comprising:
            a first tap output port configurable for an evaluation mode to receive and output the copies of the ingress packets forwarded by the first capture node; and a second tap output port configurable for the evaluation mode to receive and output the copies of the egress packets forwarded by the second capture node; and at least one out-of-band network tool coupled to the first tap output port and the second tap output port.

8. The system of claim 7, wherein the tool ports within the bypass switch are configured to be bypassed in a bypass mode of operation for the bypass switch.

9. The system of claim 7, wherein the first tap output port is configured to operate in a first configuration setting to receive and output the copies of the ingress packets and in a second configuration setting to receive and output the copies of the egress packets.

10. The system of claim 7, wherein the at least one out-of-band tool is configured to compare the copies of the ingress packets output by the first tap output port to copies of the egress packets output by the second tap output port to evaluate operation of the one or more in-line network tools.

11. The system of claim 7, wherein the bypass switch is configured to operate within a virtualization layer running on a host server.

12. A method for in-line monitoring of network packets, comprising:
  at network ports for a bypass switch,
    receiving ingress packets from a network;
  at tool ports for the bypass switch:
    receiving the ingress packets from the network ports;
    sending the ingress packets to one or more in-line network tools;
    receiving processed packets from the one or more in-line network tools; and
    forwarding the processed packets as egress packets to the network via the network ports;
  at a first capture node, copying the ingress packets from the network received by a first network port of the network ports and forwarding the copies of the ingress packets;
  at a second capture node, copying the egress packets received by a second network port of the network ports and forwarding the copies of the egress packets;
  at a first tap output port for an evaluation mode:
    receiving the copies of ingress packets forwarded by the first capture node; and
    outputting the copies of the ingress packets; and
  at a second tap output port for the evaluation mode:
    receiving the copies of egress packets forwarded by the second capture node; and
    outputting the copies of the egress packets.

13. The method of claim 12, further comprising bypassing the tool ports in a bypass mode of operation.

14. The method of claim 12, wherein the first tap output port operates in a first configuration setting to receive and output the copies of the ingress packets and in a second configuration setting to receive and output the copies of the egress packets.

15. The method of claim 12, further comprising comparing the copies of the ingress packets output by the first tap output port to the copies of the egress packets output by the second tap output port to evaluate operation of the one or more in-line network tools.

16. The method of claim 12, further comprising routing the ingress packets, the egress packets, the copies of the ingress packets, and the copies of the egress packets among the network ports, the tool ports, and the tap output ports with a switch fabric.

17. The method of claim 16, wherein the routing of the ingress packets, the egress packets, the copies of the ingress packets, and the copies of the egress packets by the switch fabric is based upon configuration information.

18. The method of claim 17, further comprising providing a user interface to allow a user to determine the configuration information for the switch fabric, and applying the configuration information to the switch fabric.

* * * * *